(12) United States Patent
Rueger et al.

(10) Patent No.: US 8,500,901 B2
(45) Date of Patent: Aug. 6, 2013

(54) INTERFERENCE PIGMENTS

(75) Inventors: Reinhold Rueger, Roedermark (DE); Klaus Ambrosius, Dieburg (DE); Marcus Mathias, Gernsheim (DE); Helge Bettina Kniess, Weiterstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 12/728,790

(22) Filed: Mar. 22, 2010

(65) Prior Publication Data

US 2010/0175587 A1   Jul. 15, 2010

Related U.S. Application Data

(63) Continuation of application No. 10/539,592, filed as application No. PCT/EP03/13943 on Dec. 9, 2003, now abandoned.

(30) Foreign Application Priority Data

Dec. 17, 2002 (DE) ................................. 102 59 301
Jan. 22, 2003 (DE) ................................. 103 02 589

(51) Int. Cl.
| | |
|---|---|
| C09C 1/0015 | (2006.01) |
| C09C 2200/1037 | (2006.01) |
| C09C 1/0021 | (2006.01) |
| C09C 1/0024 | (2006.01) |
| C09C 1/0039 | (2006.01) |
| C09C 1/3661 | (2006.01) |

(52) U.S. Cl.
USPC ........... 106/415; 106/436; 106/439; 428/404; 428/357

(58) Field of Classification Search
USPC ................. 106/415–416, 436, 439; 428/404, 428/357
See application file for complete search history.

(56) References Cited

U.S. PATENT DOCUMENTS

| | | | |
|---|---|---|---|
| 6,132,873 A * | 10/2000 | Dietz et al. ................... | 428/404 |
| 6,284,032 B2 * | 9/2001 | Andes et al. .................. | 106/436 |
| 6,517,628 B1 * | 2/2003 | Pfaff et al. .................... | 106/417 |
| 6,569,529 B1 | 5/2003 | Phillips et al. | |
| 6,579,355 B1 | 6/2003 | Schmidt et al. | |
| 6,596,070 B1 * | 7/2003 | Schmidt et al. ............... | 106/417 |
| 6,630,018 B2 * | 10/2003 | Bauer et al. ................... | 106/415 |
| 6,689,205 B1 | 2/2004 | Bruckner et al. | |
| 6,692,561 B1 | 2/2004 | Schoen et al. | |
| 6,767,633 B2 * | 7/2004 | Steudel et al. ................ | 428/357 |
| 2002/0120051 A1 | 8/2002 | Brehm et al. | |
| 2003/0039836 A1 | 2/2003 | Pfaff et al. | |
| 2003/0092815 A1 | 5/2003 | Steudel et al. | |
| 2004/0123779 A1 | 7/2004 | Bagala et al. | |

FOREIGN PATENT DOCUMENTS

| | | |
|---|---|---|
| WO | PCT/EP92/02351 | 10/1992 |
| WO | PCT/EP00/07947 | 8/2000 |
| WO | WO 01/30920 * | 5/2001 |
| WO | PCT/EP01/03159 | 10/2001 |
| WO | WO 01/77235 * | 10/2001 |

* cited by examiner

Primary Examiner — Pegah Parvini
(74) Attorney, Agent, or Firm — Millen, White, Zelano & Branigan, P.C.

(57) ABSTRACT

The present invention relates to interference pigments based on coated flake-form substrates which are distinguished by the fact in that they comprise (A) a layer of SiO$_2$ having a layer thickness of 5-350 nm, (B) a high-refractive-index coating having a refractive index n of >1.8 and/or (C) an interference system consisting of alternating high- and low-refractive-index layers and optionally (D) an outer protective layer, and to the use thereof in paints, coatings, automotive paints, powder coatings, printing inks, security printing inks, plastics, ceramic materials, glasses, paper, in toners for electrophotographic printing processes, in seed, in greenhouse sheeting and tent awnings, as absorbers in the laser marking of paper and plastics, in cosmetic formulations, for the preparation of pigment pastes with water, organic and/or aqueous solvents, and for the preparation of pigment preparations and dry preparations.

11 Claims, No Drawings

INTERFERENCE PIGMENTS

This application is a continuation of U.S. patent application Ser. No. 10/539,592, filed Jun. 17, 2005 now abandoned, which is a national phase of PCT/EP03/013943, filed Dec. 9, 2003.

The present invention relates to interference pigments based on multi-coated flake-form substrates and to the use thereof, inter alia in paints, coatings, printing inks, plastics and in cosmetic formulations.

Interference pigments are employed as lustre or effect pigments in many areas of industry, in particular in decorative coating, in plastics, in paints, coatings, printing inks and in cosmetic formulations. Pigments which exhibit an angle-dependent colour play between a plurality of interference colours are, owing to their colour play, of particular interest for automotive paints, counterfeiting-proof securities and in decorative cosmetics.

Interference pigments generally consist of flake-form supports which are coated with thin metal-oxide layers. The optical effect of these pigments is based on directed reflection of light at the flakes which are predominantly aligned parallel. Reflection of the light at the interfaces of layers of different refractive index causes the formation of interference colours (G. Pfaff in High Performance Pigments, Wiley-VCH Verlag, Weinheim, 2002, Chap. 7, Special Effect Pigments).

U.S. Pat. No. 3,331,699 describes pearlescent pigments having bright interference colours and an intense glitter effect. The pigments are based on glass flakes which are coated with a translucent, high-refractive-index metal-oxide layer. Suitable metal oxides are $ZrO_2$, $TiO_2$ and $Cr_2O_3$. The colour of the pigments here is dependent on the metal oxide selected and on the thickness of the metal-oxide layer. Many interference colours from silver via gold, violet, blue and green can be produced by different layer thicknesses. The glass composition here is not crucial for the coating with a metal oxide. In order that a coating can be achieved at all, however, the presence of a nucleating agent, such as, for example, tin dioxide or boehmite, on the glass surface is absolutely necessary.

WO 97/46624 describes pearlescent pigments which are based on glass flakes and are coated with $TiO_2$ or $Fe_2O_3$.

Lustrous pigments are only obtained if the thin metal layer on the support is very smooth and uniform. WO 97/46624 states that the coating must adhere strongly to the support in order that there is no fracture and/or detachment of the coating during processing. The user perceives inadequate adhesion of the metal-oxide layer to the support as poor mechanical stability of the pigment since the gloss drops considerably during mechanical stressing, for example due to shear forces during rubbing of the pigment in a cosmetic preparation on the skin, in the printing process, in the production of pigment granules or during pumping round the ring line of a paint shop. Even a small proportion of damaged pigment particles causes significant impairment of the coloristic properties of the pigment application.

Pigments from U.S. Pat. No. 3,331,699 and WO 97/46624 can, owing to the glass types used, only be calcined at temperatures below 600° C. However, the temperature of 600° C. here does not represent a sharp limit, but instead is a compromise of technical requirements which are difficult to combine.

Pigments with $TiO_2$ layers which have been calcined at low temperature exhibit increased photoactivity, in particular on incorporation into plastic systems, and are not suitable for articles subjected to intense or long-lasting exposure to light. The causes of this are the porosity and the large active surface areas of the precipitated metal-oxide layers, which only consolidate at calcination temperatures from 700° C. This consolidation results in reduced porosity of the metal-oxide layers and at the same time in an increase in the refractive indices and thus in improved optical properties of the pigments. At higher temperatures, however, the pigments are destroyed by the considerable softening of the glass cores and associated deformation of the flakes as well as fracture and/or detachment of the coating. Even at calcination temperatures of 600° C. or below, a reduction in the layer adhesion to the support can occur, impairing the mechanical stability of the pigments. Such pigments can only be employed to a limited extent in practice.

EP 0 753 545 B1 discloses goniochromatic lustre pigments based on high-refractive-index, transparent, non-metallic, flake-form substrates which comprise at least one layer package comprising a colourless coating having a refractive index n of ≦1.8 and a reflective, selectively or non-selectively absorbent coating. Suitable substrates, such as, for example, flake-form iron oxide, BiOCl, $TiO_2$- or $ZrO_2$-coated mica, have a refractive index n of ≧2. The goniochromatic lustre pigments exhibit an angle-dependent colour play between a plurality of intense interference colours and thus a pronounced colour flop, which is advantageous in many industrial applications, is frequently desired in decorative applications, but is undesired in the great majority of applications of pearlescent pigments.

WO 01/30920 discloses gold- and orange-coloured interference pigments of high hiding power which are distinguished by the fact that flake-form substrates are coated with at least two layer sequences comprising a low-refractive-index layer and a high-refractive-index layer comprising a metal-oxide mixture of $Fe_2O_3$ and $TiO_2$. The materials mentioned for the low-refractive-index coating are $SiO_2$, $Al_2O_3$, AlO(OH), $B_2O_3$, $MgF_2$, $MgSiO_3$ or mixtures of these oxides. However, the essential features in the case of the pigments from WO 01/30920 are the body colour and the hiding power due to the high inherent absorption of the mixed-oxide layers. Thus, only gold- and orange-coloured pigments of high hiding power are accessible, Silver-white pigments having high gloss are just as inaccessible as high-gloss pigments having bright interference colours and high transparency. There is a great demand in printing technology, in plastics, for surface coatings and in cosmetics for, in particular, silver-white pigments having improved gloss.

The object of the present invention is to provide silver-white interference pigments having high gloss and high-gloss interference pigments having bright interference colours which are mechanically stable and simple to prepare and are distinguished by further advantageous technical properties.

Surprisingly, it has now been found that interference pigments based on transparent flake-form substrates have improved gloss and exhibit more intense colours if the flakes are coated with a first layer of $SiO_2$, to which a high-refractive-index layer, such as, for example, titanium dioxide, titanium suboxide, zirconium oxide, tin oxide, chromium oxide, $Fe_2O_3$ or $Fe_3O_4$, is then applied.

In addition to their higher gloss, pigments according to the invention having glass flakes as support are distinguished over the coated glass flakes from the prior art by significantly improved calcination behaviour. The interference pigments according to the invention based on glass flakes can be calcined at temperatures >700° C. without deformation or destruction of the flake structure occurring.

The interference pigments according to the invention are thus clearly superior to the pigments from the prior art not only with respect to their optical properties, such as gloss and tinting strength, but also in their technical properties, such as, for example, mechanical stability and photostability.

The invention therefore relates to interference pigments based on flake-form substrates which are distinguished by the fact that they comprise (A) a layer of $SiO_2$ having a layer thickness of 5-350 nm,
(B) a high-refractive-index coating having a refractive index n of >1.8
and/or
(C) an interference system consisting of alternating high- and low-refractive-index layers
and optionally
(D) an outer protective layer.

The invention furthermore relates to the use of the interference pigments according to the invention in paints, coatings, in particular automotive paints, powder coatings, printing inks, security printing inks, plastics, ceramic materials, glasses, paper, in toners for electrophotographic printing processes, in seed, in greenhouse sheeting and tent awnings, as absorbers in the laser marking of paper and plastics, and in cosmetic formulations. Furthermore, the pigments according to the invention are also suitable for the preparation of pigment pastes with water, organic and/or aqueous solvents, pigment preparations and for the preparation of dry preparations, such as, for example, granules, chips, pellets, briquettes, etc. The dry preparations are particularly suitable for printing inks and in cosmetics.

Suitable base substrates for the interference pigments according to the invention are colourless or selectively or non-selectively absorbent flake-form substrates. Suitable substrates are, in particular, phyllosilicates, such as natural and/or synthetic mica, talc, kaolin, flake-form iron or aluminium oxides, glass flakes, $SiO_2$ flakes, $TiO_2$ flakes, graphite flakes, synthetic support-free flakes, titanium nitride, titanium silicide, liquid crystal polymers (LCPs), holographic pigments, BiOCl and flake-form mixed oxides, or mixtures thereof. Particularly preferred substrates are glass flakes, mica flakes and $Al_2O_3$ flakes.

Particular preference is given to glass flakes owing to their particularly smooth surface and their very high reflectivity.

The size of the base substrates is not crucial per se and can be matched to the particular application. In general, the flake-form substrates have a thickness of between 0.005 and 10 µm, in particular between 0.1 and 5 µm. The dimension in the two other ranges is usually 1-500 µm, preferably 2-300 µm and in particular 20-200 µm. Preferred smaller particle sizes are furthermore those in the range 1-100 µm, in particular 5-60 µm and 1-15 µm.

Particular preference is given to glass flakes having an average thickness of <2 µm. Thicker flakes generally cannot be employed in customary printing processes and in demanding finishes. The glass flakes preferably have thicknesses of <1 µm, in particular <0.9 µm, very particularly preferably <0.7 µm. Particular preference is given to glass flakes having thicknesses of 0.25-0.7 µm. The diameter of the glass flakes is preferably 5-300 µm, particularly preferably 10-100 µm, furthermore 5-60 µm. Glass flakes having these dimensions can be prepared, for example, by the process described in EP 0 289 240.

The glass flakes can consist of all glass types known to the person skilled in the art, such as, for example, window glass, C glass, E glass, ECR glass, Duran® glass, laboratory equipment glass or optical glass. Particular preference is given to E glass or ECR glass. The refractive index of the glass flakes is preferably 1.45-1.80, in particular 1.50-1.70.

However, the chemical composition of the glass flakes is, owing to the coating with an $SiO_2$ layer (layer (A)), of secondary importance for the further coatings and the resultant technical properties of the pigments. The $SiO_2$ coating protects the glass surface against chemical modification, such as swelling, leaching-out of glass constituents or dissolution in the aggressive acidic coating solutions.

During the calcination process, an intimate bond between the chemically related materials arises in the case of the glass flakes at the interface between glass body and precipitated-on $SiO_2$. Owing to the high softening temperature, the precipitated-on $SiO_2$ sheath gives the substrates the requisite mechanical stability, even in the case of calcination above 700° C. The adhesion of the high-refractive-index coating(s) following the $SiO_2$ layers is also very good, even above 700° C.

The thickness of layer (A) on the substrate can be varied in broad ranges depending on the desired effect. Layer (A) has thicknesses of 5-350 nm, preferably 5-150 nm. For control of gloss and tinting strength, layer thicknesses of 30-100 nm are preferred.

The $SiO_2$ layer may also be doped with carbon black particles, inorganic coloured pigments and/or metal particles if this doping is stable in air or under an inert gas at temperatures >700° C. The proportion of dopant in the $SiO_2$ matrix is then 1-30% by weight, preferably 2-20% by weight, in particular 5-20% by weight.

The high-refractive-index coating (B) preferably consists of metal oxides and/or suboxides.

Layer (B) preferably consists of metal oxides, such as, for example, $TiO_2$, $ZrO_2$, $SnO_2$, $ZnO$, $Ce_2O_3$, $Fe_2O_3$, $Fe_3O_4$, $Cr_2O_3$, $CoO$, $CO_3O_4$, $VO_2$, $V_2O_3$, $NiO$, furthermore of titanium suboxides ($TiO_2$ partially reduced with oxidation states of from <4 to 2, such as the lower oxides $Ti_3O_5$, $Ti_2O_3$ to TiO), titanium oxynitrides, FeO(OH), thin semitransparent metal layers, for example comprising Al, Fe, Cr, Ag, Au, Pt or Pd, or combinations thereof. The $TiO_2$ layer may be in the rutile or anatase modification, preference being given to rutile layers. Rutile is preferably prepared by the process from EP 0 271 767.

Layer (B) is preferably a metal-oxide layer, in particular $TiO_2$, $Fe_2O_3$, $Fe_3O_4$, $SnO_2$, $ZrO_2$ or $Cr_2O_3$. Particular preference is given to titanium dioxide.

Layer (B) can of course also consist of a plurality of high-refractive-index layers. Layer (B) preferably consists of only one layer, furthermore of two layers.

The thickness of the high-refractive-index layers depends on the desired interference colour. The thickness of layer (B) is preferably 60-300 nm. Combination of the thin $SiO_2$ layer with a high-refractive-index-metal-oxide layer enables, for example, interference colours from pure silver-white via gold to intense green to be obtained.

Further high- and/or low-refractive-index layers (layer C) can be applied alternately to layer (B). The number of layers is preferably two, furthermore three, four, five, six or seven layers.

In particular, interference packages consisting of high- and low-refractive-index layers on layer (B) result in pigments having increased gloss and a further increased interference colour.

Instead of layer (B), an interference system comprising alternating high- and low-refractive-index layers (layer C) can also be applied directly to the $SiO_2$ layer.

The thickness of the individual layers of high or low refractive index is in turn essential for the optical properties of the pigment. For the interference pigment according to the invention, the thicknesses of the individual layers must be set precisely with respect to one another. The thickness of layer (C) is 40-800 nm, preferably 60-600 nm, in particular 100-400 nm.

Suitable materials as high-refractive-index layer are all those mentioned for layer (B).

Suitable colourless low-refractive-index materials for coating (C) are preferably metal oxides or the corresponding oxide hydrates, such as, for example, $SiO_2$, $Al_2O_3$, $AlO(OH)$, $B_2O_3$, compounds such as $MgF_2$, $MgSi_3$, or a mixture of the said metal oxides. The interference system of layer (C) is, in particular, a $TiO_2$—$SiO_2$—$TiO_2$ layer sequence.

Furthermore, the interference pigments according to the invention may also have a semitransparent metal layer as outer layer. Coatings of this type are known, for example, from DE 38 25 702 A1. The metal layers are preferably chromium or aluminium layers having layer thicknesses of 5-25 nm.

The high-refractive-index layers (B) and/or (C) used can of course also be colourless high-refractive-index materials, such as, for example, metal oxides, in particular $TiO_2$ and $ZrO_2$, which have been coloured with temperature-stable absorbent colorants, such as, for example, red iron oxide or Thenard's Blue. The absorbent colorants may also be applied to the high-refractive-index coating in the form of a film. Berlin Blue and Carmine Red are preferably applied to the pre-calcined $TiO_2$ and $ZrO_2$ layers. Examples of coatings of this type are disclosed, for example, in DE 23 13 332.

Particularly preferred interference pigments are mentioned below:

glass flakes+$SiO_2$+$TiO_2$
glass flakes+$SiO_2$+$Fe_2O_3$
glass flakes+$SiO_2$+$Fe_3O_4$
glass flakes+$SiO_2$+$Cr_2O_3$
glass flakes+$SiO_2$+$TiO_2$+Berlin Blue
glass flakes+$SiO_2$+$TiO_2$+Carmine Red
glass flakes+$SiO_2$+$TiO_2$+$SiO_2$+$TiO_2$
glass flakes+$SiO_2$+$TiO_2$+Cr
mica flakes+$SiO_2$+$TiO_2$
mica flakes+$SiO_2$+$Fe_2O_3$
mica flakes+$SiO_2$+$Fe_3O_4$
mica flakes+$SiO_2$+$Cr_2O_3$
mica flakes+$SiO_2$+$TiO_2$+Berlin Blue
mica flakes+$SiO_2$+$TiO_2$+Carmine Red
mica flakes+$SiO_2$+$TiO_2$+$SiO_2$+$TiO_2$
mica flakes+$SiO_2$+$TiO_2$+Cr
$Al_2O_3$ flakes+$SiO_2$+$TiO_2$
$Al_2O_3$ flakes+$SiO_2$+$Fe_2O_3$
$Al_2O_3$ flakes+$SiO_2$+$Fe_3O_4$
$Al_2O_3$ flakes+$SiO_2$+$Cr_2O_3$
$Al_2O_3$ flakes+$SiO_2$+$TiO_2$+Berlin Blue
$Al_2O_3$ flakes+$SiO_2$+$TiO_2$+Carmine Red
$Al_2O_3$ flakes+$SiO_2$+$SnO_2$+$TiO_2$+Carmine Red
$Al_2O_3$ flakes+$SiO_2$+$TiO_2$+$SiO_2$+$TiO_2$
$Al_2O_3$ flakes+$SiO_2$+$TiO_2$+Cr Of the particularly preferred interference pigments, the coated glass flakes are particularly preferred, furthermore the coated $Al_2O_3$ flakes.

The term high-refractive-index coatings is taken to mean layers having a refractive index of >1.8, and the term low-refractive-index layers is taken to mean those having $n \leq 1.8$.

The interference pigments according to the invention can generally be prepared relatively easily.

The metal-oxide layers are preferably applied by wet-chemical methods, it being possible to use the wet-chemical coating methods developed for the preparation of pearlescent pigments. Methods of this type are described, for example, in DE 14 67 468, DE 19 59 988, DE 20 09 566, DE 22 14 545, DE 22 15 191, DE 22 44 298, DE 23 13 331, DE 15 22 572, DE 31 37 808, DE 31 37 809, DE 31 51 343, DE 31 51 354, DE 31 51 355, DE 32 11 602, DE 32 35 017 or in further patent documents and other publications known to the person skilled in the art.

In the case of wet coating, the substrate particles are suspended in water, and one or more hydrolysable metal salts or a water-glass solution are added at a pH which is suitable for hydrolysis, this pH being selected in such a way that the metal oxides or metal oxide hydrates are precipitated directly onto the flakes without secondary precipitations occurring. The pH is usually kept constant by simultaneous metering-in of a base and/or acid. The pigments are subsequently separated off, washed and dried at 50-150° C. for 6-18 hours and optionally calcined for 0.5-3 hours, it being possible for the calcination temperature to be optimised with respect to the coating present in each case. In general, the calcination temperatures are between 700 and 1000° C., preferably between 700 and 900° C. If desired, the pigments can be separated off, dried and optionally calcined after application of individual coatings and then re-suspended again for precipitation of the further layers.

The precipitation of the $SiO_2$ layer onto the substrate is generally carried out by addition of a potassium or sodium water-glass solution at a suitable pH.

Furthermore, the coating can also be carried out in a fluidised-bed reactor by gas-phase coating, it being possible correspondingly to use the processes proposed, for example, in EP 0 045 851 and EP 0 106 235 for the preparation of pearlescent pigments.

The hue of the interference pigments can be varied in very broad limits through the different choice of the coating amounts or the layer thicknesses resulting therefrom. Fine tuning for a certain hue can be achieved beyond the pure choice of amount by approaching the desired colour under visual or measurement technology control.

In order to increase the light, water and weather stability, it is frequently advisable, depending on the area of application, to subject the finished pigment to post-coating or post-treatment. Suitable post-coatings or post-treatments are, for example, the processes described in German Patent 22 15 191, DE-A 31 51 354, DE-A 32 35 017 or DE-A 33 34 598. This post-coating (layer D) further increases the chemical and photochemical stability or simplifies the handling of the pigment, in particular the incorporation into various media. In order to improve the wettability, dispersibility and/or compatibility with the user media, it is possible, for example, for functional coatings of $Al_2O_3$ or $ZrO_2$ or mixtures thereof to be applied to the pigment surface. Furthermore, organic post-coatings are possible, for example with silanes, as described, for example, in EP 0090259, EP 0 634 459, WO 99/57204, WO 96/32446, WO 99/57204, U.S. Pat. No. 5,759,255, U.S. Pat. No. 5,571,851, WO 01/92425 or in J. J. Ponjeé, Philips Technical Review, Vol. 44, No. 3, 81 ff. and P. H. Harding J. C. Berg, J. Adhesion Sci. Technol. Vol. 11 No. 4, pp. 471-493.

Compared with the pigments from the prior art without an $SiO_2$ layer on the substrate, the pigments according to the invention are distinguished by their higher chroma (tinting strength C*), their higher gloss (L value) and pronounced glitter effects, in particular in the case of the pigments based on glass or $Al_2O_3$ flakes. Compared with the goniochromatic pigments from EP 0 753 545 B1, the interference pigments according to the invention exhibit no or only low angle dependence of the colour.

Compared with the teaching from WO 01/30920, crucial advantages with respect to gloss and mechanical stability of the pigments according to the invention only arise for $SiO_2$ as material for the first coating of the support. Beyond the disclosure content of WO 01/30920, silver-white pigments and high-gloss interference pigments having bright interference colours, such as red, blue or green, are accessible with the invention. The pigments according to the invention can advantageously be blended with absorption pigments or colours owing to their transparency. Combinations of this type enable unusual colour impressions to be achieved in a particularly simple manner.

The pigments according to the invention are compatible with a multiplicity of colour systems, preferably from the area of paints, coatings and printing inks and cosmetic formulations. For the preparation of printing inks for, for example, gravure printing, flexographic printing, offset printing and offset overvarnishing, a multiplicity of binders, in particular water-soluble grades, as sold, for example, by BASF, Marabu, Pröll, Sericol, Hartmann, Gebr. Schmidt, Sicpa, Aarberg, Siegberg, GSB-Wahl, Follmann, Ruco or Coates Screen INKS GmbH, is suitable. The printing inks can be water-based or solvent-based. The pigments are furthermore also suitable for the laser marking of paper and plastics and for applications in the agricultural sector, for example for greenhouse sheeting, and, for example, for the colouring of tent awnings.

Since the interference pigments according to the invention combine high gloss with intense interference colours and highly pronounced glitter effects, particularly effective effects can be achieved with them in various application media, for example in cosmetic formulations, such as, for example, nail varnishes, lipsticks, compact powders, gels, lotions, soaps, toothpastes, in paints, such as, for example, automotive paints, industrial coatings and powder coatings, and in plastics and in ceramics.

Owing to the good skin feeling and the very good skin adhesion, the pigments according to the invention are suitable both for personal care applications, such as, for example, body lotions, emulsions, shampoos, soaps, etc., and, in particular, for decorative cosmetics.

It goes without saying that, for the various applications, the multilayered pigments according to the invention can also advantageously be used in blends with organic dyes, organic pigments or other pigments, such as, for example, transparent and opaque white, coloured and black pigments, and with flake-form iron oxides, organic pigments, holographic pigments, LCPs (liquid crystal polymers) and conventional transparent, coloured and black lustre pigments based on metal oxide-coated mica and $SiO_2$ flakes, etc. The pigments according to the invention can be mixed in any ratio with commercially available pigments and fillers.

Fillers which may be mentioned are, for example, natural and synthetic mica, nylon powder, pure or filled melamine resins, talc, $SiO_2$, glasses, kaolin, oxides or hydroxides of aluminium, magnesium, calcium or zinc, BiOCl, barium sulfate, calcium sulfate, calcium carbonate, magnesium carbonate, carbon, and physical or chemical combinations of these substances.

There are no restrictions regarding the particle shape of the filler. It can be, for example, flake-form, spherical or needle-shaped in accordance with requirements.

It is of course also possible for the pigments according to the invention to be combined in the formulations with cosmetic raw materials and assistants of any type. These include, inter alia, oils, fats, film formers, preservatives and assistants which generally determine the technical properties, such as, for example, thickeners and rheological additives, such as, for example, bentonites, hectorites, silicon dioxides, Ca silicates, gelatines, high-molecular-weight carbohydrates and, or surface-active assistants, etc.

The formulations comprising the pigments according to the invention can belong to the lipophilic, hydrophilic or hydrophobic type. In heterogeneous formulations having discrete aqueous and non-aqueous phases, the pigments according to the invention may be present in each case only one of the two phases or alternatively distributed over both phases.

The pH values of the formulations can be between 1 and 14, preferably between 2 and 11 and particularly preferably between 5 and 8.

No limits are set for the concentrations of the pigments according to the invention in the formulation. They can be—depending on the application—between 0.001 (rinse-off products, for example shower gels) and 100% (for example gloss-effect articles for particular applications).

The pigments according to the invention may furthermore also be combined with cosmetic active ingredients. Suitable active ingredients are, for example, insect repellents, UV A/BC protective filters (for example OMC, B3 or MBC), anti-ageing active ingredients, vitamins and derivatives thereof (for example vitamin A, C, E etc.), self-tanning agents (for example DHA, erythrulose, inter alia) and further cosmetic active ingredients, such as, for example, bisabolol, LPO, ectoin, emblica, allantoin, bio-flavonoids and derivatives thereof.

The pigments according to the invention are furthermore suitable for the preparation of flowable pigment preparations and dry preparations, in particular for printing inks and cosmetic applications, comprising one or more pigments according to the invention, binders and optionally one or more additives.

The invention thus also relates to the use of the pigments in formulations such as paints, coatings, automotive paints, powder coatings, printing inks, security printing inks, plastics, ceramic materials, glasses, paper, in toners for electrophotographic printing processes, in seed, in greenhouse sheeting and tent awnings, as absorbers in the laser marking of paper and plastics, in cosmetic formulations, for the preparation of pigment pastes with water, organic and/or aqueous solvents, and for the preparation of pigment preparations and dry preparations, such as, for example, granules.

The following examples are intended to explain the invention in greater detail, but without restricting it.

EXAMPLES

Example 1

150 g of glass flakes (glass A from Table 1) having an average layer thickness of 700 nm are heated to 75° C. with stirring in 1.9 l of deionised water. The pH of the suspension is then adjusted to 7.5 using 5% hydrochloric acid. Sodium water-glass solution (112 g of sodium water-glass solution comprising 26.8% of $SiO_2$ dissolved in 112 g of deionised water) is subsequently added dropwise, during which the pH is kept constant at 7.5 by simultaneous metered addition of 5% hydrochloric acid. When the addition is complete, the mixture is stirred for a further 0.5 hour. The pH of the suspension is then adjusted to 1.8, the suspension is stirred for a further 15 minutes, and tin tetrachloride solution in hydrochloric acid (3 g of $SnCl_4*5 H_2O$, dissolved in 15 ml of 25% hydrochloric acid and 85 ml of deionised water) is added dropwise, during which the pH is kept constant by simultaneous dropwise addition of 32% sodium hydroxide solution. When the addition is complete, the mixture is stirred for a further 15 minutes.

This is followed by metered addition of 30% titanium tetrachloride solution, during which the pH is kept constant by simultaneous dropwise addition of 32% sodium hydroxide solution. The coloristic properties during preparation of the pigment are monitored by colour measurement during the process, and the precipitation process is controlled in accordance with the hue (hue angle arc tan b*/a*). When the desired silver end point has been reached, the mixture is stirred for a further 15 minutes. The pigment comprises 20% of precipitated $SiO_2$, based on the glass flakes.

The product is filtered off, washed, dried at 150° C. and calcined at >700° C.

The finished pigment is incorporated into a commercially available nitro-cellulose lacquer, and paint cards are prepared. The paint cards exhibit a very pure silver-white with high gloss.

TABLE 1

Glass compositions in %

| Constituent | Glass A | Glass B |
|---|---|---|
| $SiO_2$ | 64 | 60 |
| $Al_2O_3$ | 5 | 5 |
| CaO | 6.2 | 7.7 |
| MgO | 2.2 | 5.2 |
| $B_2O_3$ | 5.3 | 6.1 |
| $Na_2O + K_2O$ | 13.5 | 16 |
| ZnO | 3.7 | 0 |
| $FeO/Fe_2O_3$ | 0.1 | 0 |

Example 2

A silver-white pigment is prepared by the process described in Example 1. Instead of glass flakes of composition A from Table 1, glass flakes of composition B having the same thickness and size distribution (20-200 μm) are used. The titanium dioxide coating is carried out to the same end point as in Example 1. The pigments obtained cannot be distinguished visually from those from Example 1.

Examples 3-5

Silver-white pigments having the following proportions by weight of $SiO_2$, based on the glass flakes, are prepared by the procedure indicated in Example 1:

Example 3

2% of $SiO_2$ by Metered Addition of 11.5 g of Water-Glass Solution Dissolved in 11.5 g of Water Example 4

5% of $SiO_2$ by Metered Addition of 28 g of Water-Glass Solution Dissolved in 28 g of Water Example 5

10% of $SiO_2$ by Metered Addition of 56 g of Water-Glass Solution Dissolved in 56 g of Water The titanium dioxide coatings are carried out to the same hue as in Experiments 1 and 2.

Examples 6 and 7

Comparative Examples without a First $SiO_2$ Layer 150 g of glass flakes of composition A from Table 1 having an average layer thickness of 700 nm are heated to 75° C. with stirring in 1.9 l of deionised water. The pH of the suspension is adjusted to pH 1.8 using hydrochloric acid. Tin tetrachloride solution in hydrochloric acid (4.5 g of $SnCl_4*5H_2O$ dissolved in 22.5 ml of 25% hydrochloric acid and 128 ml of deionised water) is subsequently added dropwise, during which the pH is kept constant by simultaneous dropwise addition of 32% sodium hydroxide solution. When the addition is complete, the mixture is stirred for a further 15 minutes. This is followed by metered addition of 30% titanium tetrachloride solution, during which the pH is kept constant by simultaneous dropwise addition of 32% sodium hydroxide solution. When the desired silver end point has been reached, the mixture is stirred for a further 15 minutes.

The product is filtered off, washed and dried at 150° C. A sample of the pigment is calcined at 600° C. (Example 6), and another is calcined at 700° C. (Example 7), in each case for 60 minutes.

The finished pigments are incorporated into a commercially available nitro-cellulose lacquer, and paint cards are prepared using the lacquer. With the pigment calcined at 600° C., the paint cards exhibit a pure silver-white with good gloss, while in the case of the pigment calcined at 700° C., the gloss is significantly reduced.

Example 8

Comparative Example 150 g of glass flakes of composition A from Table 1 having an average layer thickness of 700 nm are heated to 75° C. with stirring in 1.9 l of deionised water. The pH is adjusted to 5.5. 180 ml of aluminium chloride solution in hydrochloric acid (18 g of aluminium chloride hexahydrate) are added dropwise at 75° C. with stirring, during which the pH is held at 5 using sodium hydroxide solution. When the addition is complete, the mixture is stirred at 75° C. for a further 2 hours. The coated glass flakes are filtered off, washed, dried at 150° C. and dewatered at 400° C. for 30 minutes. After cooling, the glass flakes coated with aluminium oxide (about 5% of $Al_2O_3$) are processed further using titanium by the procedure indicated in Example 6 to give a silver-white pigment.

Compared with the pigment in accordance with the prior art from Example 6, the pigment from Example 8 shows absolutely no improvement in gloss, and compared with the pigments having an $SiO_2$ layer, the pigment exhibits significantly lower gloss.

TABLE 2

Gloss values L and chroma C* of the silver-white pigments from Examples 1-8, measured on a black background

| Experiment | Gloss value L | Chroma C* |
|---|---|---|
| 1 | 76 | 3.5 |
| 2 | 76 | 3.6 |
| 3 | 73 | 2.16 |
| 4 | 75 | 2.82 |
| 5 | 76 | 3.4 |
| 6 (comparison) | 66 | 1.9 |
| 7 (comparison) | 56 | 1.67 |
| 8 (comparison) | 62 | 1.8 |

Example 9

Testing of the Mechanical Stability

The abrasion stability of the pigment in cosmetic preparations can be tested in a practical test. It is determined here whether the mechanical stability of a pigment is sufficient for use, for example, in compact powders or creams. As a rapid test, rubbing of a pigment sample with the finger on the palm of the hand has proven successful. In the case of layer detachment or fracture of the pigment particles by the rubbing, the gloss of the rubbed sample is reduced or completely lost. The decrease in gloss is assessed visually in steps from 1 to 5, where step 1 denotes no change or an increase in gloss during rubbing and step 5 denotes strong matting. Step 3 is regarded as usable to a limited extent for practice, 4 and 5 are regarded as unusable.

The pigments from Examples 1-7 are subjected to an abrasion test of this type. The results are shown in Table 3 and show that only the pigments according to the invention having an $SiO_2$ layer have adequate mechanical stability for cosmetic applications.

TABLE 3:

| Pigment | Glass type | $SiO_2$ layer | Abrasion stability |
|---|---|---|---|
| Experiment 1 (invention) | A | approx. 70 nm | 1 |
| Experiment 2 (invention) | B | approx. 70 nm | 1 |
| Experiment 3 (invention) | A | approx. 7 nm | 3 |
| Experiment 4 (invention) | A | approx. 17 nm | 2 |
| Experiment 5 (invention) | A | approx. 35 nm | 1 |
| Experiment 6 (comparison) | A | 0 | 5 |
| Experiment 7 (comparison) | A | 0 | 5 |

Example 10

Comparative Experiment 100 g of aluminium oxide flakes (prepared as described in EP 0 763 573 B1, Example 2) are suspended in 2 liters of deionised water in a 5 liter laboratory reactor. 200 ml of aqueous $SnCl_4$ solution (36 g of $SnCl_4$ per liter of solution) are added dropwise at 3 ml/min at 75° C. with stirring. The pH of the suspension is held at 1.8 by metered addition of sodium hydroxide solution. The mixture is stirred for a further 10 minutes, and aqueous titanium tetrachloride solution (125 g of $TiCl_4$/liter of solution) is then metered in at a rate of 3 ml/min, during which the pH is held at 1.7-1.9 by addition of sodium hydroxide solution. In this way, the aluminium oxide flakes are coated with a titanium dioxide layer, where, with increasing layer thickness of the titanium dioxide layer, firstly a silver-white and then coloured interference colours of first to third order are formed. The coloristic properties of the interference pigment are measured during the coating process with the aid of a gap-form measurement cell which is connected to the reactor and through which reaction mixture is pumped continuously during the coating. During flow through the gap of the measurement chamber, the pigment flakes are aligned substantially parallel to the flow direction and are measured against a black background. Using a commercially available Minolta CR 300 colour measurement cell, the light reflected at an angle after flash illumination is measured. The measurement data are converted into CIELAB values in accordance with DIN 5033 Part 3 and displayed. In this way, the coloristic properties of the pigment can be determined at any stage of the coating. FIG. 1 shows the course of the coloristic properties of the coating in the form of an $a^*/b^*$ diagram. In the system, +a values represent red, −a values represent green, +b values represent yellow and −b values represent blue. The measurement curve begins at the coordinate origin and shows the interference colour corresponding to the titanium dioxide coating. The chroma of the pigments is greater the further the colour location is separated from the coordinate origin.

Example 11

100 g of aluminium oxide flakes (prepared as described in EP 0 763 573 B1, Example 2) are suspended in 1.6 liters of deionised water in the laboratory reactor from Example 10. The pH of the suspension is set to 8, and sodium water-glass solution (190 g of sodium water-glass solution comprising 26.8% of $SiO_2$ dissolved in 190 g of deionised water) is subsequently added dropwise, during which the pH is kept constant at 8 by simultaneous metered addition of 5% hydrochloric acid. When the addition is complete, the mixture is stirred for a further 0.5 hour. The pH of the suspension is then adjusted to 1.8 using 5% hydrochloric acid, the mixture is stirred for a further 15 minutes, and tin tetrachloride solution in hydrochloric acid (4.5 g of $SnCl_4*5\ H_2O$ dissolved in 22.5 ml of 25% hydrochloric acid and 128 ml of deionised water) is added dropwise, during which the pH is kept constant by simultaneous dropwise addition of 32% sodium hydroxide solution. When the addition is complete, the mixture is stirred for a further 15 minutes, and aqueous titanium tetrachloride solution (125 g of $TiCl_4$/liter of solution) is then metered in at a rate of 3 ml/min, during which the pH is held at 1.7-1.9 by addition of sodium hydroxide solution. The coloristic properties of the pigment are measured as in Example 10 during the $TiO_2$ coating. The comparison shows that the pigments according to the invention have significantly better chroma ("tinting strength") than pigments from the prior art (FIG. 2). In addition, the pigments according to the invention exhibit significantly higher gloss.

Example 12

150 g of glass flakes (glass C from Table 4) having an average layer thickness of 900 nm are heated to 75° C. with stirring in 1.9 l of deionised water. The pH of the suspension is then adjusted to 7.5 using 5% hydrochloric acid. Sodium water-glass solution (112 g of sodium water-glass solution comprising 26.8% of $SiO_2$ dissolved in 112 g of deionised water) is subsequently added dropwise, during which the pH is kept constant at 7.5 by simultaneous metered addition of 5% hydrochloric acid. When the addition is complete, the mixture is stirred for a further 0.5 hour. The pH of the suspension is then adjusted to 1.8, the mixture is stirred for a further 15 minutes, and tin tetrachloride solution in hydrochloric acid (3 g of $SnCl_4*5\ H_2O$ dissolved in 15 ml of 25% hydrochloric acid and 85 ml of deionised water) is added dropwise, during which the pH is kept constant by simultaneous dropwise addition of 32% sodium hydroxide solution. When the addition is complete, the mixture is stirred for a further 15 minutes.

This is followed by metered addition of 30% titanium tetrachloride solution, during which the pH is kept constant by simultaneous dropwise addition of 32% sodium hydroxide solution. The coloristic properties are monitored during preparation of the pigment by colour measurement during the process, and the precipitation process is controlled in accordance with the hue (hue angle arc tan b*/a*). When the desired silver end point has been reached, the mixture is stirred for a further 15 minutes. The pigment comprises 20% of precipitated $SiO_2$, based on the glass flakes.

The product is filtered off, washed, dried at 150° C. and calcined at >700° C.

The finished pigment is incorporated into a commercially available nitro-cellulose lacquer, and paint cards are prepared. The paint cards exhibit a very pure silver-white with high gloss.

TABLE 4

Glass compositions in %

| Constituent | Glass C | Glass D |
|---|---|---|
| $SiO_2$ | 65.7 | 64.8 |
| $Al_2O_3$ | 4.0 | 4.9 |
| CaO | 5.9 | 5.6 |
| MgO | 1.9 | 1.7 |
| $B_2O_3$ | 5.4 | 4.2 |
| $Na_2O + K_2O$ | 12.7 | 14.7 |
| ZnO | 4.3 | 3.9 |
| $FeO/Fe_2O_3$ | 0.1 | 0.2 |

Example 13

A silver-white pigment is prepared by the process described in Example 12. Instead of glass flakes of composition C from Table 4, glass flakes of composition D having the same thickness and size distribution (20-200 µm) are used. The titanium dioxide coating is carried out to the same end point as in Example 12. The pigments obtained cannot be distinguished visually from those from Example 12.

Examples 14-16

Silver-white pigments having the following proportions by weight of $SiO_2$, based on the glass flakes, are prepared by the procedure indicated in Example 12:

Example 14

2% of $SiO_2$ by Metered Addition of 11.5 g of Water-Glass Solution Dissolved in 11.5 g of Water Example 15

5% of $SiO_2$ by Metered Addition of 28 g of Water-Glass Solution Dissolved in 28 g of Water Example 16

10% of $SiO_2$ by Metered Addition of 56 g of Water-Glass Solution Dissolved in 56 g of Water The titanium dioxide coatings are carried out to the same hue as in Examples 12 and 13.

Examples 17 and 18

Comparative Examples without a First $SiO_2$ Layer 150 g of glass flakes of composition C from Table 4 having an average layer thickness of 900 nm are heated to 75° C. with stirring in 1.9 l of deionised water. The pH of the suspension is adjusted to pH 1.8 using hydrochloric acid. Tin tetrachloride solution in hydrochloric acid (4.5 g of $SnCl_4*5\ H_2O$ dissolved in 22.5 ml of 25% hydrochloric acid and 128 ml of deionised water) is subsequently added dropwise, during which the pH is kept constant by simultaneous dropwise addition of 32% sodium hydroxide solution. When the addition is complete, the mixture is stirred for a further 15 minutes. This is followed by metered addition of 30% titanium tetrachloride solution, during which the pH is kept constant by simultaneous dropwise addition of 32% sodium hydroxide solution. When the desired silver end point has been reached, the mixture is stirred for a further 15 minutes.

The product is filtered off, washed and dried at 150° C. A sample of the pigment is calcined at 600° C. (Example 17), and another is calcined at 700° C. (Example 18), in each case for 60 minutes.

The finished pigments are incorporated into a commercially available nitro-cellulose lacquer, and paint cards are prepared using the lacquer. With the pigment calcined at 600° C., the paint cards exhibit a pure silver-white with good gloss, while in the case of the pigment calcined at 700° C., the gloss is significantly reduced.

Example 19

Comparative Example 150 g of glass flakes of composition C from Table 4 having an average layer thickness of 900 nm are heated to 75° C. with stirring in 1.9 l of deionised water. The pH is adjusted to 5.5. 180 ml of aluminium chloride solution in hydrochloric acid (18 g of aluminium chloride hexahydrate) are added dropwise at 75° C. with stirring, during which the pH is held at 5 using sodium hydroxide solution. When the addition is complete, the mixture is stirred at 75° C. for a further 2 hours. The coated glass flakes are filtered off, washed, dried at 150° C. and dewatered at 400° C. for 30 minutes. After cooling, the glass flakes coated with aluminium oxide (about 5% of $Al_2O_3$) are processed further using titanium dioxide by the procedure indicated in Example 17 to give a silver-white pigment.

Compared with the pigment in accordance with the prior art from Example 17, the pigment from Example 19 shows absolutely no improvement in gloss, and compared with the pigments having an $SiO_2$ layer, the pigment exhibits significantly lower gloss.

Example 20

Testing of the Mechanical Stability

The testing of the mechanical stability is carried out analogously to Example 9.

The pigments from Examples 12-18 are subjected to an abrasion test of this type. The results are shown in Table 5 and show that only the pigments according to the invention having an $SiO_2$ layer have adequate mechanical stability for cosmetic applications.

TABLE 5

Abrasion stability

| Pigment | Glass type | $SiO_2$ layer | Abrasion stability |
|---|---|---|---|
| Experiment 12 (invention) | C | approx. 90 nm | 1 |
| Experiment 13 (invention) | D | approx. 90 nm | 1 |
| Experiment 14 (invention) | C | approx. 9 nm | 3 |
| Experiment 15 (invention) | C | approx. 22.5 nm | 2 |

TABLE 5-continued

Abrasion stability

| Pigment | Glass type | SiO$_2$ layer | Abrasion stability |
|---|---|---|---|
| Experiment 16 (invention) | C | approx. 45 nm | 1 |
| Experiment 17 (comparison) | C | 0 | 5 |
| Experiment 18 (comparison) | C | 0 | 5 |

Example 21

125 g of glass flakes (glass D from Table 4) having an average layer thickness of 500 nm are heated to 75° C. with stirring in 1.75 l of deionised water. The pH of the suspension is then adjusted to 8 using 5% hydrochloric acid. Sodium water-glass solution (67 g of sodium water-glass solution comprising 26.8% of SiO$_2$ dissolved in 67 g of deionised water) is subsequently added dropwise, during which the pH is kept constant at 7.5 by simultaneous metered addition of 5% hydrochloric acid. When the addition is complete, the mixture is stirred for a further 15 minutes. The pH of the suspension is then adjusted to 2.8, the mixture is stirred for a further 15 minutes, and about 320 ml of 15% iron chloride solution in hydrochloric acid are added dropwise, during which the pH is kept constant by simultaneous dropwise addition of 32% sodium hydroxide solution. The coloristic properties of the pigment are measured as in Example 10 during the coating. When the addition is complete, the mixture is stirred for a further 15 minutes. The pigment comprises 10% of precipitated SiO$_2$, based on the glass flakes.

The product is filtered off, washed, dried at 150° C. and calcined at >700° C.

The finished pigment is incorporated into a commercially available nitro-cellulose lacquer, and paint cards are prepared. The paint cards exhibit a very pure iron oxide red with high gloss.

Example 22

125 g of glass flakes (glass D from Table 4, particle sizes 10-60 μm) having an average layer thickness of 500 nm are heated to 75° C. with stirring in 1.75 l of deionised water. The pH of the suspension is then adjusted to 7.5 using 5% hydrochloric acid. Sodium water-glass solution (67 g of sodium water-glass solution comprising 26.8% of SiO$_2$ dissolved in 67 g of deionised water) is subsequently added dropwise, during which the pH is kept constant at 7.5 by simultaneous metered addition of 5% hydrochloric acid. When the addition is complete, the mixture is stirred for a further 15 minutes.

The pH of the suspension is then adjusted to 1.8, the mixture is stirred for a further 15 minutes, and tin tetrachloride solution in hydrochloric acid (2.5 g of SnCl$_4$*5 H$_2$O dissolved in 12.5 ml of 25% hydrochloric acid and 70 ml of deionised water) is added dropwise, during which the pH is kept constant by simultaneous dropwise addition of 32% sodium hydroxide solution. When the addition is complete, the mixture is stirred for a further 15 minutes.

The pH of the suspension is subsequently held at 1.8, and aqueous titanium tetrachloride solution (400 g of TiCl$_4$/liter of solution) is metered in at a rate of 2 ml/min, during which the pH is held at 1.7-1.9 by addition of sodium hydroxide solution. The coloristic properties of the pigment are measured as in Example 10 during the TiO$_2$ coating. When the requisite hue angle has been reached, the pH is adjusted slowly to pH 8 by addition of 32% NaOH, and sodium water-glass solution (9.8 g of sodium water-glass solution comprising 26.8% of SiO$_2$ dissolved in 9.8 g of deionised water) is again added dropwise, during which the pH is kept constant at 7.5 by simultaneous metered addition of 5% hydrochloric acid. When the addition is complete, the mixture is stirred for a further 15 minutes. The volume of the sodium water-glass solution must be calculated accurately since it is not possible to monitor colour formation in coloristic terms during the coating.

The pH is then again adjusted to pH 1.8 using 5% hydrochloric acid, and aqueous titanium tetrachloride solution (400 g of TiCl$_4$/liter of solution) is metered in at a rate of 2 ml/min, during which the pH is held at 1.7-1.9 by addition of sodium hydroxide solution. The end point of the titration is determined from the hue angle. The pigment comprises 10% of precipitated SiO$_2$, based on the glass flakes.

The product is filtered off, washed, dried at 150° C. and calcined at >700° C.

The finished pigment is incorporated into a commercially available nitro-cellulose lacquer, and paint cards are prepared. The paint cards exhibit a very pure and bright interference colour with high gloss.

The invention claimed is:

1. Interference pigments based on coated flake-form substrates, comprising a substrate coated with
    (A) a first layer on said substrate of SiO$_2$ having a layer thickness of 5-350 nm, followed by
    (B) a high-refractive-index coating having a refractive index n of >1.8, that consists of TiO$_2$, Fe$_2$O$_3$, Fe$_3$O$_4$, Cr$_2$O$_3$, or titanium suboxides
    and/or
    (C) an interference system consisting of alternating high- and low-refractive-index layers, said high index layers being those of (B),
    and optionally thereon
    (C1) a semi-transparent metal layer, and/or
    (D) an outer protective layer,
    wherein the flake-form substrates are flake-form aluminium oxide or glass flakes.

2. The interference pigment according to claim 1, having a thickness of layer (A) of 30-100 nm.

3. The interference pigment according to claim 1, wherein layer (B) is titanium dioxide.

4. The interference pigment according to claim 1, wherein layer (C) is present.

5. The interference pigment according to claim 4, wherein layer (C) has a TiO$_2$—SiO$_2$—TiO$_2$ layer sequence.

6. The interference pigment according to claim 1, having an outer protective layer (D) increasing light, temperature and weather stability.

7. A process for the preparation of an interference pigment according to claim 1, comprising coating of the substrate wet-chemical methods, by hydrolytic decomposition of metal salts in aqueous medium or by gas-phase coating in a fluidized-bed reactor.

8. Paints, coatings, automotive paints, powder coatings, printing inks, security printing inks, plastics, ceramic materials, glasses, paper, toners for electrophotographic printing processes, seeds, greenhouse sheeting, tent awnings, absorbers in laser marking of paper and plastics, cosmetic formulations, pigment pastes with water, organic and/or aqueous solvents, or pigment preparations, comprising an interference pigment according to claim 1.

9. The interference pigment according to claim 1, wherein the substrate is glass flakes having an average thickness of <2 μm.

10. The interference pigment according to claim 1, wherein layer B has a thickness of 60-300 nm.

11. The interference pigment according to claim 1, that is:

glass flakes+$SiO_2$+$TiO_2$
glass flakes+$SiO_2$+$Fe_2O_3$
glass flakes+$SiO_2$+$Fe_3O_4$
glass flakes+$SiO_2$+$Cr_2O_3$
glass flakes+$SiO_2$+$TiO_2$+Berlin Blue
glass flakes+$SiO_2$+$TiO_2$+Carmine Red
glass flakes+$SiO_2$+$TiO_2$+$SiO_2$+$TiO_2$
glass flakes+$SiO_2$+$TiO_2$+Cr
$Al_2O_3$ flakes+$SiO_2$+$TiO_2$
$Al_2O_3$ flakes+$SiO_2$+$Fe_2O_3$
$Al_2O_3$ flakes+$SiO_2$+$Fe_3O_4$
$Al_2O_3$ flakes+$SiO_2$+$Cr_2O_3$
$Al_2O_3$ flakes+$SiO_2$+$TiO_2$+Berlin Blue
$Al_2O_3$ flakes+$SiO_2$+$TiO_2$+Carmine Red
$Al_2O_3$ flakes+$SiO_2$+$SnO_2$+$TiO_2$+Carmine Red
$Al_2O_3$ flakes+$SiO_2$+$TiO_2$+$SiO_2$+$TiO_2$ or
$Al_2O_3$ flakes+$SiO_2$±$TiO_2$±Cr.

* * * * *